United States Patent
Weisglass et al.

[11] 3,883,243
[45] May 13, 1975

[54] LIGHT COLOR REGULATING APPARATUS

[75] Inventors: Louis L. Weisglass, New York, N.Y.; Robert A. Flieder, Englewood Cliffs, N.J.

[73] Assignee: Berkey Photo, Inc., New York, N.Y.

[22] Filed: Sept. 25, 1973

[21] Appl. No.: 400,646

[52] U.S. Cl. .................. 355/35; 355/71; 355/77
[51] Int. Cl. ............................................. G03b 27/76
[58] Field of Search ...................... 355/35, 71, 77

[56] References Cited
UNITED STATES PATENTS

| | | | |
|---|---|---|---|
| 3,077,140 | 2/1963 | Simmon et al. | 355/35 |
| 3,438,709 | 4/1969 | Hatashita | 355/35 |
| 3,754,824 | 8/1973 | Weisglass et al. | 355/71 |

Primary Examiner—Samuel S. Matthews
Assistant Examiner—E. M. O'Connor
Attorney, Agent, or Firm—Toren, McGeady and Stanger

[57] ABSTRACT

The disclosed apparatus forms part of the lamp house in a photographic enlarger. Three dichroic filters partially intercept a white light beam emerging from a light source. The filters divide the beam into a white portion and an intensely colored portion. A mixing chamber receives the beam to mix the white and intensely colored light which is used to illuminate a color slide or negative having a color image. Suitable controls coupled to the filters move the filters into and out of the beam along a continuous path between predetermined limits that define the maximum and minimum color densities of the light emerging from the chamber. A number of readouts coupled to the controls display the extent to which the filters have been moved between the limits and represent the colored density of the position of the filters. The readouts exhibit a given reading for a predetermined color and density. When the character of the beam is changed by changing the source, it is necessary for the controls to readjust the filters to different positions in order to obtain the predetermined color and density. A coupler decouples the readouts from the controls so that the readouts can be set to the same readings for the predetermined color and density when the controls cause the filters to produce the predetermined color and density. The controls and readouts are then recoupled.

29 Claims, 17 Drawing Figures

LIGHT COLOR REGULATING APPARATUS

BACKGROUND OF THE INVENTION

This invention relates to light coloring apparatuses, and particularly to lamp houses for photographic enlargers. The invention also relates to photographic enlargers.

In photographic color enlargers, light is passed through a positive or negative color film whose image is to be printed and an optical system focuses the light past through the film onto a color printing paper. U.S. Pat. No. 3,754,824 discloses a means for coloring the light raised through the light film to compensate for the color balance of the film, the printing paper, and the original white light source. The system disclosed therein allows the light across the film to be accurately adjusted for uniform intensity, chromaticity, and saturation. The system allows the intensity, chromaticity, and saturation achieved for one set of circumstances to be accurately reproducible at a later time, despite a number of intervening changes.

In such a system a lamp source produces a "white" light beam. The beam is colored to compensate for the color balance of the film by intercepting the beam with three dichroic filters so as to color one part of the beam and by mixing the portions of the beam with each other before passing it through the image on the slide or film and focusing it on the printing paper. The degree of intercept by each of the filters is established by manually movable controls. Suitable readouts register the degree to which the controls move the filters. Thus, for each combination of chromaticity or color saturation or density, there exist three defining numbers. An operator can then return to these numbers to achieve an accurate reproduction of the particular intensity chromaticity and saturation.

In a large laboratory, an operator uses such a system by analyzing each negative with a photometer or video analyzer. This displays a positive image which the operator adjusts to produce a pleasing result. The photometer or analyzer produces numbers which correspond to the numbers in the enlarger system. A whole day's or week's work might be analyzed at one time before any of the negatives are used with the enlarger. The numbers applied by the photometer or analyzer to the negatives are then transferred to the counters in the enlarger for each particular negative. Once a week an operator may check the equipment against a standard negative.

Such an enlarging system normally operates extremely well throughout its entire range. However a change in the light source or lamp of such an enlarger may produce some errors. A new lamp may produce a beam which is offset from the original beam. Thus for any position of the filters, and hence for any settings of the controls, different, intensities, chromaticities and saturations may result. The reflectance of the dichroic reflector of the lamp, which normally transmits the infrared portion of the spectrum of the lamp as well as some of the red light in the lamp, may also change from lamp to lamp. For this reason the spectrum of the beam itself may differ from the original beam. Therefore, the operator must adjust for an error for each negative when a new lamp replaces an old one.

An object of the invention is to improve such light color regulating apparatuses.

Another object of the invention is to improve enlarger systems.

Another object of this invention is to avoid the aforementioned shortcomings.

SUMMARY OF THE INVENTION

According to a feature of this invention, these objects are attained, in whole or in part, by enlarging the controls with readout means that are decoupleable from the controls and by decoupling the readout means from the controls to permit the numbers associated with the standard negative to be set in the readout means when the controls set the filters to accommodate the standard negative. This introduces the required correction for a different lamp.

According to another feature of the invention the controls and the readout means operate linearly with respect to each other and with respect to the filters so that the correction is linear throughout the ranges to be used.

According to another feature of the invention the controls include gears which operate cams that move holders for the filters.

According to another feature of the invention, the readout means operate on the basis of gears.

According to another feature of the invention, the decoupling means decouple the gears from each other during correction adjustment.

According to another feature of the invention the readout means are in the form of digital counters.

According to another feature of the invention the readout means are in the form of an analog scale.

According to another feature of the invention the scale is transverse, and according to another feature of the invention the scale is circular.

The aforementioned features are only several of the various features that characterize the invention. These and other features of the invention are pointed out in the claims forming a part of the specification. Other objects and advantages of the invention will become evident from the following detailed description when read in light of the accompanying drawing.

DESCRIPTION OF PREFERRED EMBODIMENTS

Figures 1, 2, 3, 5, 6, 7:
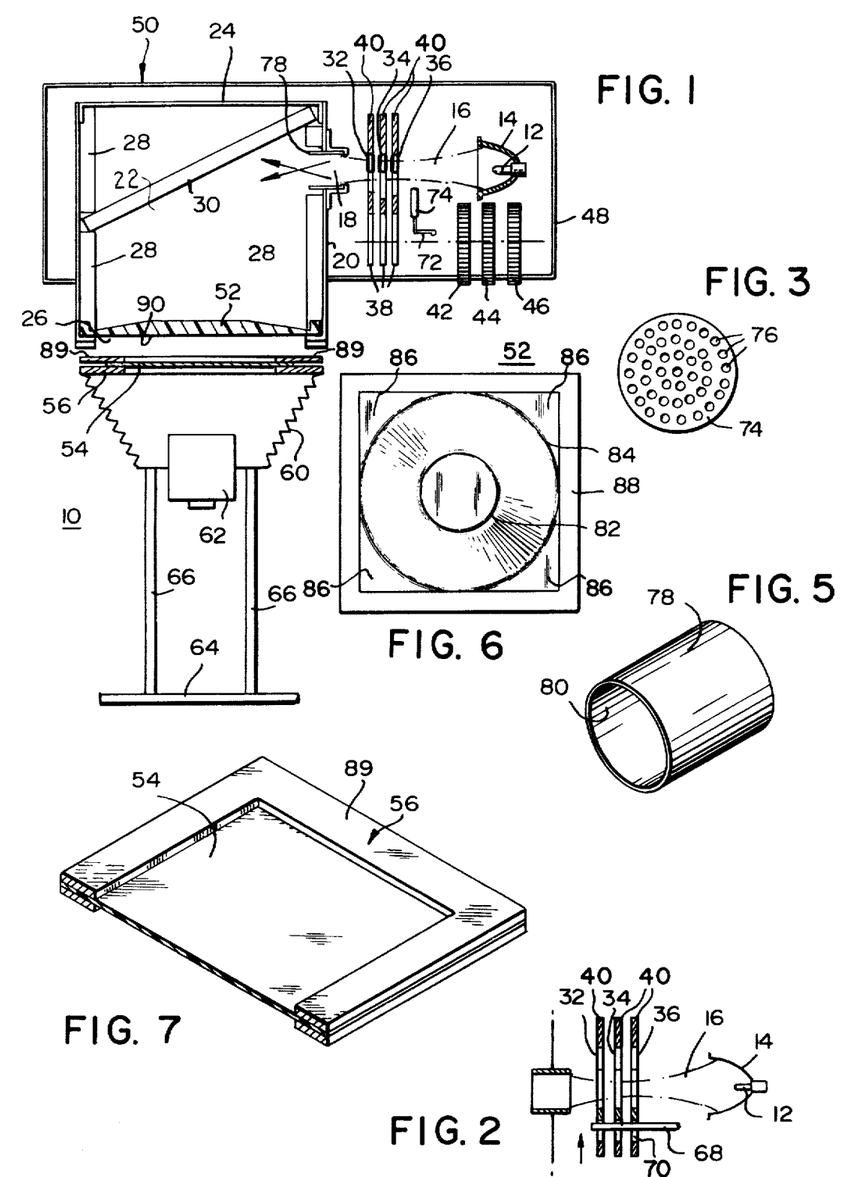
FIG. 1 is a somewhat schematic elevation of an enlarger embodying features of the invention.
FIG. 2 is a schematic illustration of a portion of FIG. 1 with filters moved out of the path of the light beam.
FIG. 3 is a drawing illustrating an attenuator of the enlarger of FIG. 1.
FIG. 5 is a perspective view of a cylindrical mirror in FIG. 1.
FIG. 6 is a plan view of a diffusing plate used in FIG. 1.
FIG. 7 is a perspective view of a film carrier forming a part of FIG. 1.

In the enlarging apparatus 10 of FIG. 1, a light source 12, together with an elliptical reflector 14, directs a light beam toward the entrance port 18 of the front wall 20 in a mixing chamber 22. The mixing chamber is generally composed of a metal shell 24 having an exit opening 26 extending virtually across the bottom. Solid, expanded white foam panels 28 line the front and side walls of the chamber 22 while a ceiling or roof panel 30 extends angularly upward from the end away from the source 12 toward the end closer to the source. The ceiling panel 30 lies in the path of the light beam entering the entrance port 18.

Three dichroic filters 32, 34, and 36 intercept a portion of the beam so as to impart an intense color to the intercepted portion of the beam. The filters 32, 34, and 36 pass the respective subtractive primary colors, cyan, yellow and magenta. Suitable cams move respective filter holders 40 which are each biased against the cams 38 by respective springs. Each holder 40 supports one of the filters 32, 34, and 36 so that each filter intercepts a portion of the beam determined by the rotary position of each cam 38 engaging its holder 40. Each of the filters 32, 34, and 36 may then intercept different portions of the beam 16.

Suitable knurled wheels 42, 44, and 46 extending through the housing 48 of the overall light mixer 50 are each coupled to one of the cams 38. Thus, an operator may set the intercepting portion of the filter 32 by turning the wheel 46 to a particular position. A digital indicator, not shown in FIG. 1, apprises the operator of the extent to which the filter 32 intercepts the beam 16 and the extent to which the wheel 46 has been turned. Similarly, digital indicators indicate the extent to which the filters 34 and 36 enter the beam 16 on the basis of the extent to which the wheels 44 and 42 have been turned. The cams 38 and the wheels 42, 44, and 46 are coaxial with each other and coupled by coaxially surrounding shafts (not shown in FIG. 1).

Within the chamber 22 the opaque ceiling panel 30 composed of white, hardened foam material, reflects the partly colored beam in many directions. Together with the remaining panels 28, each of which corresponds to the panel 30, it bounces the light back and forth in many directions. Ultimately, the panels 28 and 30 mix the white portion of the beam with the colored portion so as to achieve the saturation or density depending on the overall degree to which the filters 32, 34, and 36 extend into the beam. The color balance of the resulting beam, the factor often called chromaticity, is determined by the degree to which each filter extends into the beam relative to the other filters.

The dispersed and mixed light leaves the chambers through a translucent opal diffusion or scattering plate 52 in the exit opening 26. This light can then pass through an interchangeable color film 54 mounted in a removable film carrier 56. Light then passes from the transparency, i.e., the negative 54, through adjustable bellows 60 to an adjustable objective 62. The latter focuses the light as modified by the negative upon the printing paper, not shown, mounted on a carrier 64.

Suitable racks 66 support the upper projection portion of the enlarger 10, namely the lamp house, above the paper carrier. In the usual manner, the position of the lamp house of the enlarger is adjustable on the racks 66 by means of pinions for up and down movement. This adjusts the size of the image being focused upon the printing paper in the print carrier 64. The housing 50 can be removed from the enlarger for servicing and adjusting.

An arm 68 passing loosely through the opening 70 of the holders 40 can be operated from outside the housing 50 to withdraw all the filters simultaneously from the positions shown in FIG. 1 where they engage the cams, out of the beam 16, and into the position showns shown in FIG. 2. This allows uncolored light from the source 12 and the reflector 14 to illuminate the film 54. The wheels 42, 44, and 46 can each only move one filter at a time with the cams 38.

Figure 4:
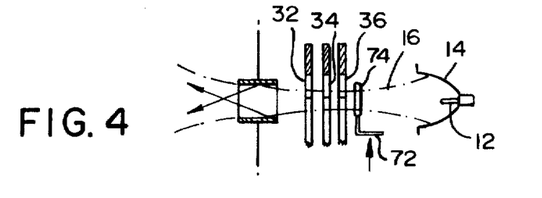
FIG. 4 is a schematic illustration showing the attenuator of FIG. 3 in the path of the beam of FIG. 4.

Moreover, an arm 72, operable from outside the housing, moves a light attenuator 74, such as shown in FIG. 3, from a position shown in FIG. 1 to the position shown in FIG. 4. The light attenuator is composed of a metal plate having a plurality of substantially evenly distributed light perforations. The perforations pass approximately 25% of the light. When moved into the position shown in FIG. 4, the light attenuator reduces the overall intensity of the light beam emerging from the source 12 and the reflector 14 by 75%. It thus dims the illumination of the film 54 and the image on the paper in the carrier 64.

The source 12 and the elliptical reflector 14 make the beam converge to a narrow waist and diverge as shown in FIGS. 1,2,4. The filters are located to intercept the beam at the narrow waist, that is, the narrowest portion of the beam. The beam thereafter diverges as it enters the chamber 22. As the diverging light beam 16 passes through the entrance port 18, a cylindrical mirror 78, having an interior reflecting surface, reflects the outer margin of the beam diagonally across the beam. In this way the light from one side of the beam now passes to the other side. Thus, the colored portion of the beam is reflected to the light portion and the light portion toward the colored portion. This improves the mixing process within mixing chamber.

The translucent diffusing plate 52 at the bottom exit 26 tapers outwardly from the thick, circular center 82 toward a thin, circular rim 84 (shown in FIGS. 1 and 6). From the circular rim 84, the material remains thin at the corner margin 86 toward a thickened square, support frame 88. The entire plate is monolithic and composed of a diffusing or scattering material such as an acrylic resin with minute reflective particles in suspension.

The plate produces increased transmission at the edges as compared to the center. It has the effect of compensating for the fall-off in intensity from the center to the edges. This fall-off is normally experienced when using a uniform diffuser. It results from the cosine law fall-off occuring from the center of the light beam toward the edges. The diffusion plate 52 returns the scattered light into the chamber while the remaining light passes through the diffusion plate. This effect, aside from producing uniformity, increases efficency.

Also raising the efficiency of the system significantly is the carrier 56 which is illustrated in detail in FIG. 7. Here the upper surface 89 of the carrier is either painted white or mirrored. The surface 89 reflects any light emerging from the diffuser back to the diffuser 52 and into the chamber. The bottom surface 90 of the plate 52 has a matte finish. This prevents the plate 52 from rereflecting the upwardly directed light. It allows most of the light to pass from the surface 89 into the mixing chamber 22.

Figures 8, 9:
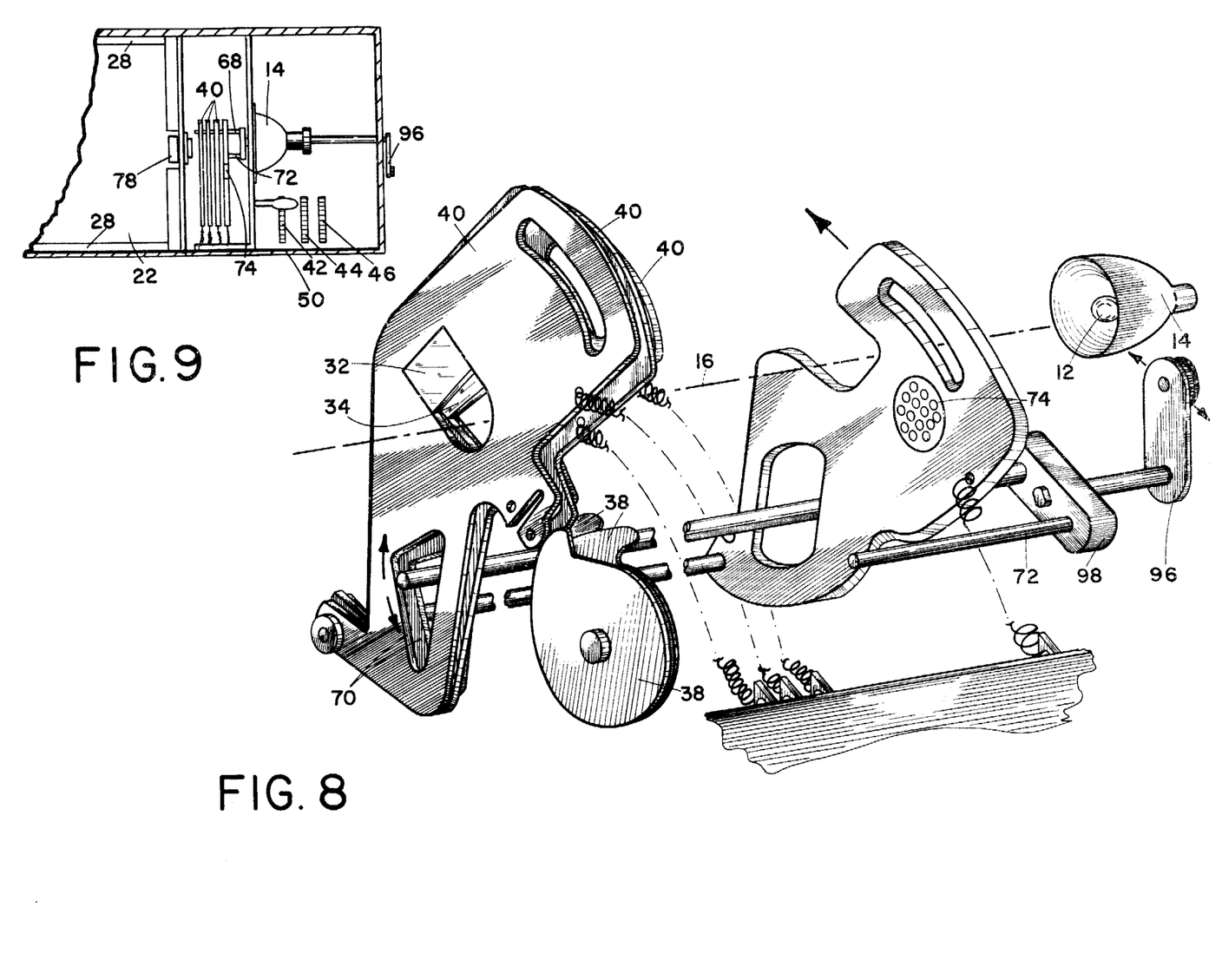
FIG. 8 is an exploded view of a filter control illustrated in FIG. 1.
FIG. 9 is a plan view of the structure of FIG. 8 as it is assembled within the housing.

FIGS. 8 and 9 illustrate details of the mechanism which move the filters 32, 34, and 36 in response to the wheels 42, 44, and 46. Here, indexing stops (not shown) allow movement of a lever 96 to three discreet positions. In the central position shown, the lever 96 centers a crossbar 98 so that the arm 68 passes through the opening 70 in the holders 40 and 106 affecting their positions. In this state, three springs 100 bias the holders 40 clockwise about a shaft 102 and against the respective peripheral surfaces of the cams 38. The arm 68 also passes through an opening 104 in a holder 106 for the attenuator 74. Here a spring 108 biases the holder 106 clockwise about the shaft 102.

When the lever 96 is moved upwardly toward its up index position, the crossbar 98 transports the arm 72 upwardly. In its upward rise, the arm 72 engages a ledge 110 in the holder 106 and displaces the latter against the force of the spring 108. The resulting movement ends in the upper indexing position of the lever 96. It locates the attenuator 74 across the beam 16. During this time, the arm 68 travels downwardly in the opening 104 and the opening 70 without engaging the surfaces of the holders 40 or 106.

When an operator moves the lever 96 back to its central position, the spring 108 withdraws the holder 106 and the attenuator 74 from the path of the beam 16.

As the lever 96 is placed in its downward position, the crossbar 98 displaces the arm 68 upwardly. The latter engages the interior surface 112 at the opening 70 and drives the holders 40, simultaneously, away from the cams 38 against the forces of the springs 100. This removes the filters 32, 34, and 36 from the path of the beam 16. Thus, simple means permit the normal color compensating light to be changed to an attenuated or dimmed light, or a "white" light with but a single lever.

Figure 10:
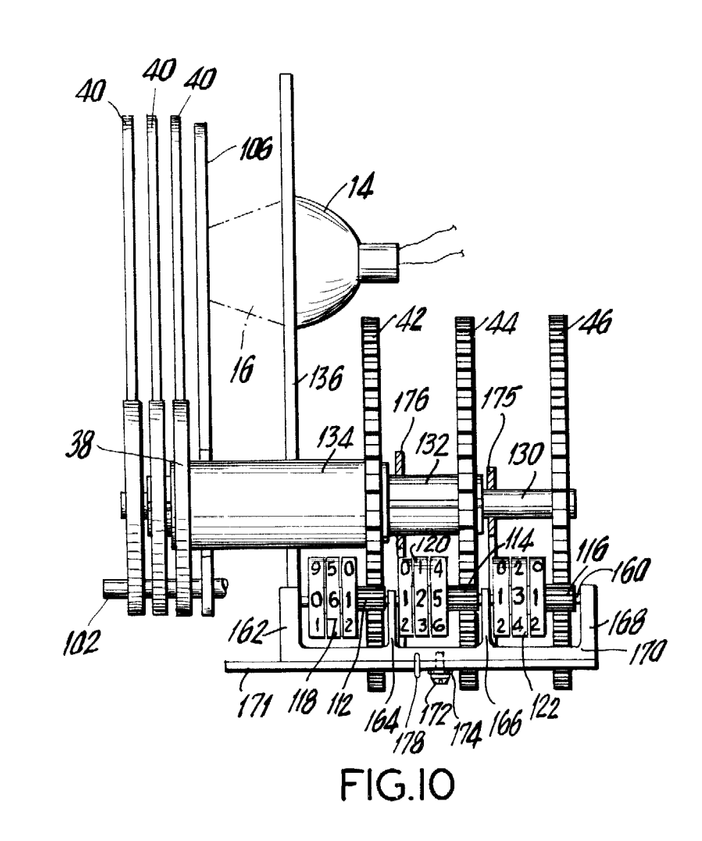
FIG. 10 is a detailed elevational of the filter positioning apparatus and the indicating apparatus of FIG. 1 and embodying features of the invention.
Figure 11:
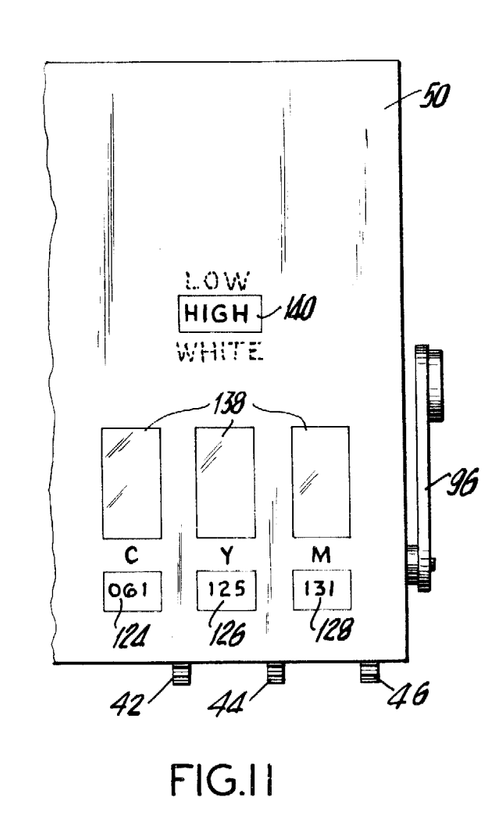
FIG. 11 is an elevation of the cover plate on part of the housing enclosing the apparatus in FIG. 10 and embodying features of the invention.

The knurling at the peripheries of the wheels 42, 44, and 46 constitute gear teeth as shown in FIGS. 10 and 11. These gear teeth project through openings in the bottom of the housing 50 so that an operator can conveniently turn them. Three spur gears 112, 114, and 116 engaging the teeth at the edges of the respective wheels 42, 44, and 46 operate respective three-digit decimal counters 118, 120, and 122. Three of the digits in each counter project through suitable windows 124, 126, and 128 in the housing 50 as shown in FIG. 11.

A shaft 130 keyed to the wheel 46 couples the rotation of the wheel to the leftmost cam 38. A hollow shaft 132 coaxially surrounding the shaft 130 and keyed to the wheel 44 couples the rotation of the wheel 44 to the center cam 38. A second hollow shaft 134 couples the rotation of the wheel 42 to the rightmost cam 38. A suitable bearing (not shown) supports the shaft in an interior wall 136 upon which the reflector 14 is mounted.

The counter 118 is calibrated so that it reads 000 when the wheel 42 has moved the rightmost cam 38 to the position in which it lifts the holder 40 with the filter 36 furthest against the force of the spring 100. Under these circumstances the filter 36 would be substantially out of the path of the beam 16. Similarly, 000 indications by the counters 120 and 122 in the windows 126 and 128 are calibrated to denote that the filters 34 and 36 have been moved as far out as possible from the path of the beam 16 by the cams 38 and 40. For displaying the actual colors of the filters being moved by the wheels 42, 44, and 46 to extents indicated in the windows 124, 126 and 128, the front panels of the housing 50 carries three rectangular color spots 138 corresponding to the colors of the filters 32, 34, and 36. These spots are located directly above the windows 124, 126, and 128 indicating the portion of that color filter. The initials C, Y and M appear between the corresponding spot and window to indicate cyan, yellow and magenta, The counters 118, 120 and 122 are further calibrated to read 170 when the wheels turn the cams 38 so that the holders are at the "lowest" point on each cam. That is to say, a reading of 170 indicates that the filters intercept as much as the beam 16 as possible, namely, almost all of the beam.

A window 140 displays an indication "HIGH" when the lever 96 is in its central position. This is accomplished by coupling between the lever 96 and a plate behind the window 140. When the lever 96 is pushed into its downward position the word "LOW" appears in the window 140, and "WHITE" appears when the lever is in its downward position.

To assist in the accuracy of the calibration and to ensure consistency in the various models of the same enlarger each of the holders 40 is furnished with a cam follower portion 142 that engages the respective cams 38. An elongated notch in each holder allows adjustment of the position of the filter within the holder relative to the surface of the cam. This adjustment can be accomplished by producing a permanent set in the material at the end of the notch when each enlarger is calibrated during production. Suitable hole may be used to assist in achieving the set.

Figure 12:
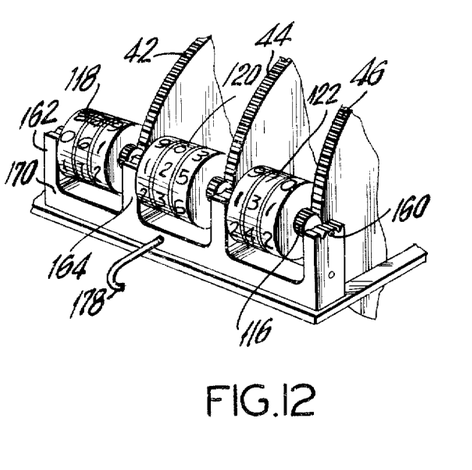
FIG. 12 is a perspective view of the apparatus in FIG. 11.
Figure 13:
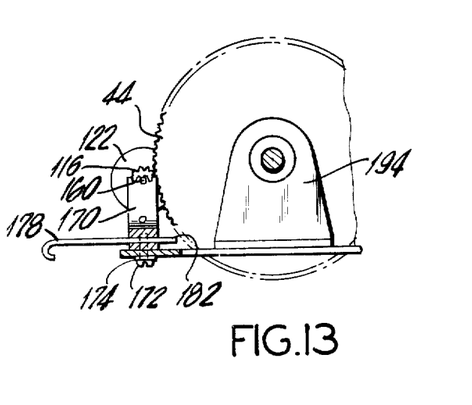
FIG. 13 is a partly sectional view of the apparatus in FIG. 11.

As shown in FIGS. 10, 12, and 13, the counters 118, 120, and 122, together with the spur gears 112, 114, and 116 which drive the counters, are mounted on a shaft 160. Four bearing posts 162, 164, 166, and 168, integrally forming a part of a pedestal 170 support the shaft 160 in suitable bearings. The shaft 160 may be composed of several coaxially aligned shaft portions separated from each other rather than a single shaft. In any case the entire assembly of counters 118, 120, and 122, and spur gears 112, 114, and 116, are mounted on the pedestal 170 which is in turn secured to a plate 171 by a bolt 172, and a spring washer 174. The plate 171 supports bearing posts 175 and 176 as well as the wall 136 so as to carry the assembly composed of gears 42, 44, and 46 and shafts 134, 132, and 130. Normally the pedestal 170 and the posts 175 and 176 as well as the wall 136 are positioned to engage the gears 42, 44 and 46 with the respective spur gears 112, 114, and 116.

The bolt 172 is sufficiently tight against the spring or expansion washer 174 to hold the pedestal 170 firmly but to allow for further compression of the washer 174. A cane shaped key 178 fits slidably through a hole 180 in the pedestal 170 and terminates in a blunt expanded end 182 which prevents removal of the key. The fit between the key 178 and the hole 180 is sufficiently tight to prevent slippage of the key but looose enough to allow an operator to push the key inwardly and to withdraw it. When passed in, the key 178 is hidden behind the removable front plate or face of the housing 50.

Under normal circumstances the operator pushes the key 178 so that its handle can be hidden behind the front face of the housing 50. When it becomes necessary for the operator to readjust the calibration as a result of repositioning or replacement of the lamp 14, he removes the front plate of the housing and withdraws the key 178 until the expanded end 182 strikes the pedestal 170. He then presses downwardly on the key 178 so that the key travels vertically. This downward force rocks the pedestal 170 about its lower forward edge and draws the bolt 172 upwardly against the force of the spring or expansion washer 174. Since the bolt 172 is not completely tightened against the spring washer 174 the pedestal 170 can pull the bolt 172 upwardly and rock about its forward edge. According to a preferred embodiment of the invention, the washer 174 is composed of two spring washers to provide added resilient force.

According to an embodiment of the invention, the bottom face of the pedestal 170 does not rest quite flat against the plate 171. Rather it rests on its forward edge and the force of the spring 174, by drawing the bolt 172 downwardly articulates the pedestals about its forward edge so that it biases the spur gears 112, 114, and 116 against the wheels 42, 44, and 46.

When an operator pushes down on the key 178 and rocks the pedestal 170, he disengages the spur gears 112 to 116 from the wheels 42 to 46 and allows the wheels 42 to 46 and the counters 118 to 122 to be adjusted relative to one another. When the operator releases the key 128 the spring washer 174 rocks the pedestal 170 in the clockwise direction as shown in FIGS. 12 and 13 until the spur gears 112 to 116 reenegage the wheels 42 to 46. The cams 38 move the filters 32, 34, and 36 so as to produce substantially predictable linear relationships between the respective readings in the counters 118, 120, and 122 and the optical densities or saturations of the three combined colors (i.e. the color components of the final color) at the diffusion plate 52.

Figure 14:
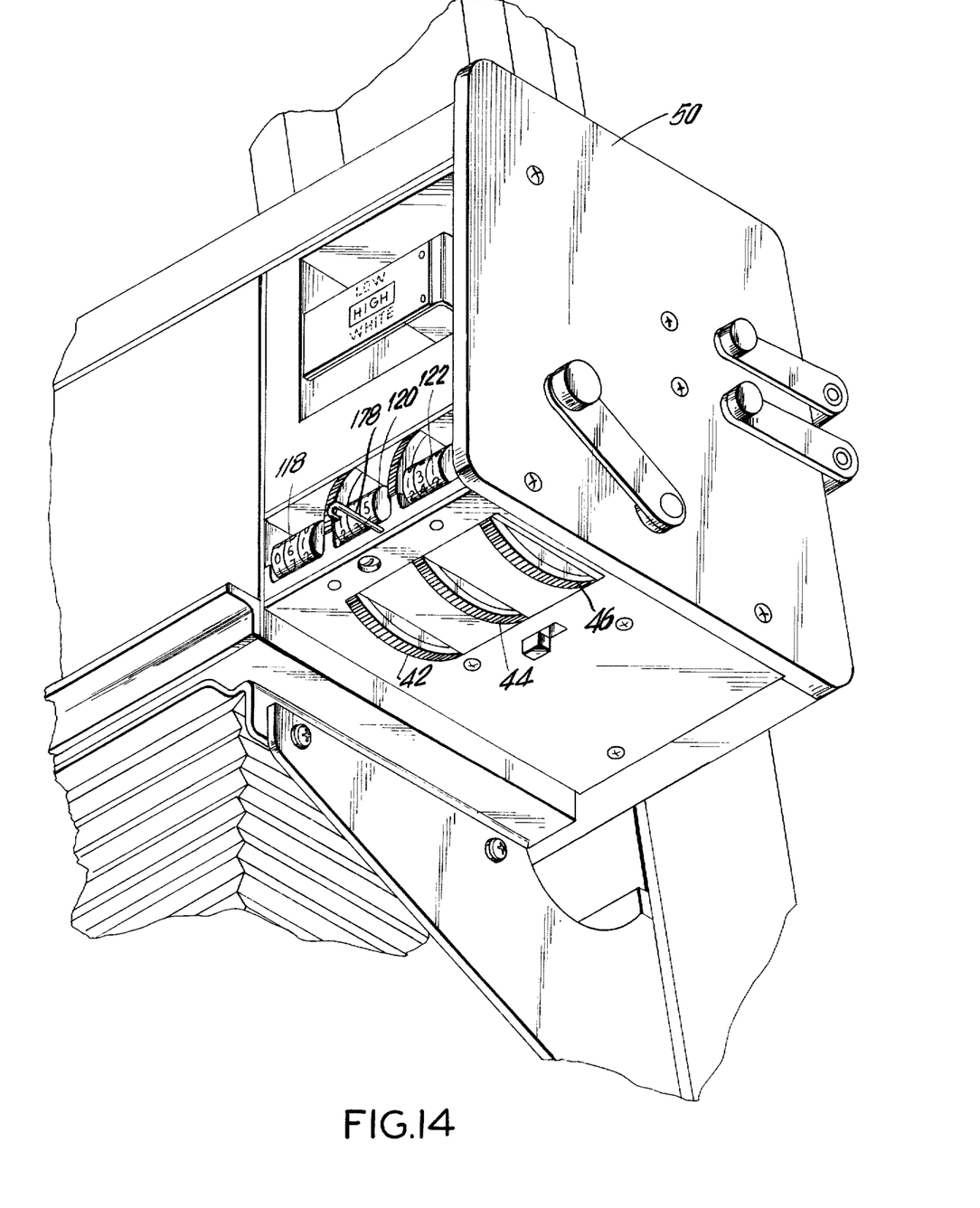
FIG. 14 is a perspective view of a detail of the enlarger in FIG. 1 and showing features which embody the invention.

FIG. 14 illustrates perspectively the system of FIG. 1 with the key 178 projecting from the pedestal 170 with the front plate of the housing 50 removed.

It will be noted that the filters 32, 34, and 36 in each holder 40 are substantially aligned with the center of the cams 38 and the point of contact of each holder with each cam. This produces a substantially predictable relationship between the cam and the position of the corresponding filter. Moreover, the leading edge of each filter 32, 34, and 36 is substantially perpendicular to its path of travel about the shaft 102. This also lends a degree of predictability of position.

Figure 15:
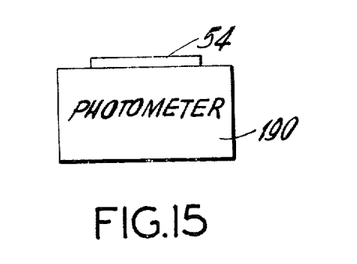
FIG. 15 is a schematic illustration of means for analyzing a negative for use in FIG. 1.

The housing 50 may assume almost any one of a number of positions with respect to the eye level of the operator, as the lamp house is moved to adjust the printed image. This makes convenience of operation and observation essential. In operation, an operator, or his assistant, analyzes a group of negatives 54 in a photometer or video analyzer 190 as shown in FIG. 15. Each of the negatives 54 is then assigned a series of numbers corresponding to those to which the counters 118, 120, and 122 must be set to produce an optimum enlargement. The operator then places a negative 54 in a carrier 56 and then places the carrier in the enlarger. He adjusts the wheels 42, 44, and 46 until the numbers corresponding to those assigned by the photometer 190 are shown by the counters 118, 120, and 122. This compensates for the particular color balance inherent in the particular type of film being used, the type of image on the film, the type of printing paper being used, and the "whiteness" of the lamp 12. The operator may make note of the particular numbers established so that a corresponding setting can be achieved at a later date. He then focuses the objective and projects the image on the printing paper. After the exposure the print is developed.

The operator then repeats the procedure for succeeding negatives 54. The system permits continuously variable color correction in densities from zero to 170 (on the counters 118, 120, and 122) without the use of supplementary filters. Each time the operator returns to the same negative he dials the same numbers to produce the desired result.

The invention assists the operator in accommodating replacement lamps within the system. When one lamp burns out, it must be replaced by another. Each new lamp introduces new color conditions. Each lamp is composed of the source 12 and the reflector 14. The latter reflects visible light and transmits infrared light out of the back of the reflector. This avoids heat in the optical system. Such a reflector is called a cold mirror. Unfortunately, such reflectors also transmit a portion of the red visible light out of the back of the reflector. The amount or spectrum of the light transmitted varies from lamp to lamp. Thus the light reflected also varies. Thus the color for which the filters 32, 34, and 36 must compensate varies from lamp to lamp.

As a further point, the aim of the lamp may cause an error. Each lamp aims at a point slightly different from the next because of tolerances in manufacturing lamps. Thus the filters may intercept different portions of the beam.

Because the relationship between the light at the film and the position of the filters, and the number of the counters 118 is linear, the aforementioned errors in lamp position and "whiteness" can be translated into linear values throughout the scale of the counters 118 to 122. According to the invention, the readings of the counters 118 to 122 are displaced. This can be done not only when a lamp is replaced but on a regular basis to account for various shifts in positions of a lamp.

In general a photographer checks the equipment once per week with standard negatives. This negative produces a good print at predetermined settings of the counters 118 to 122. If, when the lamp is changed, the operator suspects or finds deviation he runs a test print at the predetermined settings. It is then possible to determine the deviation from a desirable print by shifting the values until he reaches a setting at which a desirable or optimum print is produced.

At this point the operator pulls out the key 178 and presses down to disengage the spur gears 112, 114, and 116 from the wheels 42, 44, and 46. While the gears are disengaged the operator manually resets the counters to the predetermined numbers while the wheels 42, 44, and 46 remain in their positions.

The resulting offset is corrective throughout the entire extent of the scale because of the aforementioned linear relationships.

Of course, once the numbers have been adjusted, and an offset placed into the system, dialing to the limit will not cause the counters 118, 120 and 122 to read 0. In fact, this is one way that the operator can determine that an offset has been placed into the system.

By virtue of this system, the operator need not reanalyze the negatives that have been previously analyzed and assigned numbers. Setting the counters 118 to 122 to the numbers assigned to each negative produces the optimum color print desired. As a result a whole day's or week's work of analyzing need not be redone simply because a lamp has been replaced.

Figure 16:
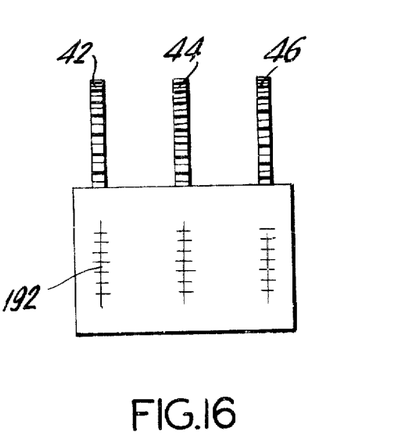
FIG. 16 is a somewhat simplified system corresponding to FIG. 10 and illustrating another embodiment of the invention.
Figure 17:
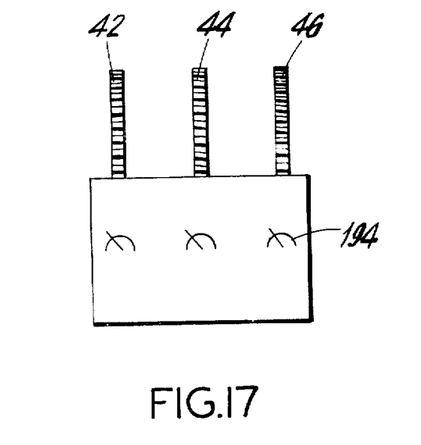
FIG. 17 is a simplified version of the apparatus shown in FIG. 10 and illustrating yet another embodiment of the invention.

According to the invention the wheels 42, 44, and 46, need not drive spur gears connected with counters such as 118, 120, and 122. Rather, the spur gears may drive linear scales 192 as shown in FIG. 16 in a manner well known. They may also drive circular scales 194 as shown in FIG. 17 in any well known manner. The spur gears 112, 114, and 116 may be engaged and disengaged in the same manner as in FIGS. 10 through 13 and in FIGS. 16 and 17.

According to another embodiment of the invention, the key 178 projects through the front place or face of the housing 50. This makes it unnecessary to remove the face of the housing 50 to withdrawn the key 178 and adjust the counters 118 to 122.

The location of the wheels at the bottom of the lamp house furnishes substantial operator convenience when the enlarger is elevated for large magnification. An auxiliary lamp behind the front panel of the housing illuminates the digital readouts. which are substantially color coded by the spots 138. The readouts indicate filtration to 0.01 with absolute precision and insure repeatability. The precise control afforded through the use of digital readouts also permits high filter-control gearings and thus full filtration range from 0 to 170 can be dialed in less than one revolution of the wheel. The auxiliary lamp behind the front panel is designated 152.

It should be noted that the springs 100, which are connected at one end to the holders 40, are secured at the other ends to an extension of the wall 136 in the housing 50.

The mixing chamber 22 constitutes what is sometimes called a light integrator or integrating chamber.

While embodiments of the invention have been described in detail it will be obvious to those skilled in the art that the invention may be embodied otherwise without departing from its spirit and scope.

What is claimed is:

1. A color control apparatus, comprising
a housing;
light source means replaceably mounted in said housing for forming a light beam;
color filter means movable at least partially into the path of the beam for coloring at least a portion of the beam and leaving the remainder of the beam uncolored when only a portion of the beam is colored;
chamber means in the path of the beam beyond the filter means for mixing the colored portion of the beam with the remainder of the beam so as to produce a light whose color and density vary in response to the color of the filter means and the extent to which the filter means intercepts the beam;
control means coupled to the filter means for moving the filter means into and out of the beam along a continuous path between limits which define the maximum and minimum color densities of the colored light produced by the chamber means so as to control the color density of the color produced by the chamber means;
readout means coupled to said control means for displaying a reading indicating the extent to which filter means has been moved between the limits and hence the color density of the light which the chamber means produces;
said source means being replaceable so as to result in change in the character of the beam relative to said filter means;
said control means being settable to a first position for one source means creating one beam and to a second position for another source means changing the character of the beam;
decoupling means engaging said readout means for decoupling the readout means from said control means to permit matching of a given reading for a predetermined color and density set by the control means and for recoupling said control means and said readout means thereafter.

2. An apparatus as in claim 1, wherein said color filter means include a plurality of filters and said control means include a plurality of controls coupled to said filters, said readout means including a plurality of displays each display being coupled to one of said controls, said decoupling means disengaging and reengaging each of the controls with each of said displays.

3. An apparatus as in claim 2, wherein said controls produce a linear relationship between the movement of said filters and said displays.

4. An apparatus as in claim 3, wherein said controls each includes a cam coupled to one of said displays and a cam follower for moving one of the filters.

5. An apparatus as in claim 2, wherein each of said controls includes a gear, said displays each including a spur engageable with a respective one of the gears, said decoupling means decoupling each of the spurs from the gears and recoupling them.

6. An apparatus as in claim 5, wherein said controls each includes a cam coupled to one of said displays and a cam follower for moving one of the filters, said gears being coupled to said cams for movement of said cams.

7. An apparatus as in claim 5, wherein said decoupling means includes bearing means for mounting the spurs and resilient means for allowing movement of said bearing means relative to said gears so as to disengage the spurs from the gears.

8. An apparatus as in claim 7, wherein said controls each includes a cam coupled to one of said displays and a cam follower for moving one of the filters, said gears being coupled to said cams for movement of said cams.

9. An apparatus as in claim 7, wherein said resilient means includes a post resiliently mounting said bearing means and said decoupling means further including an operator movable key for moving said bearing means.

10. An apparatus as in claim 9, wherein said key is movable within said bearing means for allowing withdrawal from said bearing means.

11. An apparatus as in claim 10, wherein said displays are digital.

12. An apparatus as in claim 5, wherein said displays are digital.

13. An apparatus as in claim 1, wherein said control means move said filter means to produce a linear relationship between the display of said readout means and the density of the color.

14. An apparatus as in claim 13, wherein said control means includes cam means coupled to said readout means and cam follower means holding said filter means.

15. An apparatus as in claim 1, wherein said control means includes gear means engaging said readout means and movable by an operator, said readout means including spur means, said decoupling means decoupling and recoupling said gear means and spur means.

16. An apparatus as in claim 15, wherein said control means includes cam means coupled to said readout means and cam follower means holding said filter means, said gear means being coupled to said cam means for movement of said cam means.

17. An apparatus as in claim 15, wherein said decoupling means includes bearing means for mounting said spur means, said decoupling means having resilient means for allowing movement of said bearing means relative to said gear means so that said bearing means can disengage said spur means from said gear means in response to movement of said bearing means by an operator.

18. An apparatus as in claim 17, wherein said control means includes cam means coupled to said readout means and cam follower means holding said filter means, said gear means being coupled to said cam means for movement of said cam means.

19. An apparatus as in claim 17, wherein said resilient means includes a post resiliently mounting said bearing means and said decoupling means further including an operator movable key for moving said bearing means.

20. An apparatus as in claim 19, wherein said key is movable within said bearing means for allowing withdrawal from said bearing means.

21. An apparatus as in claim 20, wherein said readout means is digital.

22. An apparatus as in claim 15, wherein said readout means is digital.

23. An enlarger, comprising a color control apparatus, comprising a housing;

light source means replaceably mounted in said housing for forming a light beam;

color filter means movable at least partially into the path of the beam for coloring at least a portion of the beam and leaving the remainder of the beam uncolored when only a portion of the beam is colored;

objective means for holding a film in the path of light from said chamber means and for producing an image on the film on a predetermined plane;

chamber means in the path of the beam beyond the filter means for mixing the colored portion of the beam with the remainder of the beam so as to produce a light whose color and density vary in response to the color of the filter means and the extent to which the filter means intercepts the beam;

control means coupled to the filter means for moving the filter means into and out of the beam along a continuous path between limits which define the maximum and minimum color densities of the colored light produced by the chamber means so as to control the color density of the colored light produced by the chamber means.

readout means coupled to said control means for displaying a reading indicating the extent to which filter means has been moved between the limits and hence the color density of the light which the chamber means produces;

said source means being replaceable so as to result in change in the character of the beam relative to said filter means;

said control means being settable to a first position for one source means creating one beam and to a second position for another source means changing the character of the beam;

decoupling means engaging said readout means for decoupling the readout means from said control means to permit matching of a given reading for the predetermined color and density set by the control means and for recoupling said controls means and said readout means thereafter.

24. An enlarger as in claim 23, wherein said color filter means include a plurality of filters and said control means include a plurality of controls coupled to said filters, said readout means including a plurality of displays each display being coupled to one of said controls said decoupling means disengaging and reengaging each of the controls with each of said displays.

25. An apparatus as in claim 24, wherein said controls produce a a linear relationship between the densities of the colors and the indications of said displays.

wherein said controls each include a cam coupled to one of said displays and a cam follower for moving one of the filters;

wherein each of said controls includes a gear, said displays each including a spur engageable with a respective one of the gears, said decoupling means decoupling each of the spurs from the gears and recoupling them;

wherein said decoupling means includes bearing means for mounting the spurs and resilient means for allowing movement of said bearing means relative to said gears so as to disengage the spurs from the gears.

wherein said controls each includes a cam coupled to one of said displays and a cam follower for moving one of the filters, said gears being coupled to said cam for movement of said cams;

wherein said resilient means includes a post resiliently mounting said bearing means and said decoupling means further including an operator movable key for moving said bearing means;

wherein said key is movable within said bearing means for allowing withdrawal from said bearing means.

26. An enlarger as in claim 23 wherein said control means move said filter means to produce a linear relationship between the density of the color and the indication of said readout means;

wherein said control means includes cam means coupled to said readout means and cam follower means holding said filter means;

wherein said control means include gear means engaging said readout means and movable by an operator, said readout means including spur means, said decoupling means decoupling and recoupling said gear means and spur means;

wherein said decoupling means includes bearing means for mounting said spur means, said decoupling means having resilient means for allowing movement of said bearing means relative to said gear means so that said bearing means can disengage said spur means from said gear means in response to movement of said bearing means by an operator;

wherein said resilient means includes a post resiliently mounting said bearing means and said decoupling means further including an operator movable key for moving said bearing means;

wherein said key is movable within said bearing means for allowing withdrawal from said bearing means.

27. The method of producing color prints with an enlarger comprising analyzing a number of negatives to determine their color characteristics and assigning numbers to each negative on the basis of the analysis;

for each negative setting an indicator to the assigned numbers and thereby simultaneously positioning a plurality of color filters to intercept a portion of a beam from a light source an amount corresponding to the numbers;

mixing the unintercepted portion of the beam with the intercepted portion of the beam so as to produce colored compensating light;

projecting the colored compensating light through the film onto a plane for enlargement;

in response to changes in the nature of the beam readjusting the color compensating light by varying the amount that the filters intercept the beam;

adjusting the portions which indicate the numbers to the numbers for the negative to which the filters were adjusted; and disengaging the portion for adjusting the numbers from the portion adjusting the filters during one of the last two mentioned adjusting steps.

28. The method as in claim 27, wherein the step of disengaging is done during the step of adjusting the filters.

29. The method as in claim 27, wherein the step of disengaging is accomplished during the step of adjusting the numbers.

* * * * *